(12) United States Patent
Taciuk et al.

(10) Patent No.: US 6,203,765 B1
(45) Date of Patent: *Mar. 20, 2001

(54) THERMAL APPARATUS AND PROCESS FOR REMOVING CONTAMINANTS FROM OIL

(75) Inventors: William Taciuk; Steve Odut; Gordon Taciuk; Charlie Wheeler, all of Calgary (CA)

(73) Assignee: Alberta Oil Sands Technology & Research Authority, Edmonton (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,441
(22) Filed: Oct. 23, 1997

Related U.S. Application Data

(62) Division of application No. 08/727,345, filed on Jul. 10, 1996, now abandoned.

(30) Foreign Application Priority Data

Sep. 23, 1996 (CA) .................................................. 2186658

(51) Int. Cl.$^7$ ................................ F28D 21/00; B01J 8/10
(52) U.S. Cl. ........................ 422/210; 422/204; 422/201; 422/202; 422/233; 196/112
(58) Field of Search .................................... 196/104, 107, 196/112, 117, 119; 422/209, 232, 233, 200, 198, 173, 201–204, 210, 224–229

(56) References Cited

U.S. PATENT DOCUMENTS

| | | | |
|---|---|---|---|
| 3,630,501 | 12/1971 | Shabaker | 263/19 B |
| 3,655,518 | 4/1972 | Schmalfeld et al. | 202/108 |
| 4,303,477 | 12/1981 | Schmidt et al. | 201/2.5 |
| 4,439,209 | 3/1984 | Wilwerding et al. | 48/76 |
| 4,473,464 | 9/1984 | Boyer et al. | 208/126 |
| 5,423,891 | 6/1995 | Taylor | 48/197 |

FOREIGN PATENT DOCUMENTS 1334129   1/1995   (CA).

*Primary Examiner*—Shrive Beck
*Assistant Examiner*—Alexa A. Doroshenk
(74) *Attorney, Agent, or Firm*—Millen, White, Zelano & Branigan, P.C.

(57) ABSTRACT

Used oil is treated in a reactor to remove contaminants. The reactor comprises a rotating vessel forming an internal reaction chamber. The vessel is housed within a heating chamber. The inside of the vessel is indirectly heated by conduction through the vessel walls. The reaction chamber contains a permanently resident charge of non-ablating, granular coarse solids. Within the reaction chamber, the oil is vaporized and pyrolyzed, producing a hydrocarbon vapour. Coke is formed as a byproduct. Contaminants, such as metals and halides, become associated with the coke. The coarse solids scour and comminute the coke to form fine solids. The fine solids are separated within the reaction chamber from the coarse solids and are removed from the vessel through a pipe located at the axis of the vessel. The hydrocarbon vapours are also removed from the vessel through the axial pipe, as a separate stream. Residual fine solids are separated in a cyclone from the vapour stream. The cleaned vapour stream is then condensed to produce a substantially contaminant-free product oil. The contaminant-rich solids are collected for disposal.

4 Claims, 4 Drawing Sheets

THERMAL APPARATUS AND PROCESS FOR REMOVING CONTAMINANTS FROM OIL

CROSS-REFERENCE TO RELATED APPLICATION

This application is a divisional of application Ser. No. 08/727,345, filed Jul. 10, 1996, now abandoned.

FIELD OF THE INVENTION

The invention relates to a process for removing contaminants from used oil by subjecting the oil to vaporization and pyrolysis, whereby coke is formed. The contaminants remain with the coke, which can be separated from the oil. The invention further relates to a rotating, indirectly heated retort or reactor in which the process is practised.

BACKGROUND OF THE INVENTION

Processes are known for reclaiming oil from contaminated used oil (sometimes referred to as waste oil).

One such process is disclosed in U.S. Pat. No. 5,271,808, issued Dec. 21, 1993 to Shurtleff. Shurtleff discloses a process wherein an inclined boiler heats the waste oil, vaporizing and driving off lighter hydrocarbons at temperatures of about 650° F. Heavier hydrocarbons and contaminants, amounting to about 10% of the original oil, collect as a sludge in the bottom of the boiler. The sludge drains for disposal. The lighter hydrocarbons are condensed as a reclaimed oil product.

However, Shurtleff's process produces an oily waste which itself requires specialized disposal.

Other methods which can produce a reclaimed oil and an oil-dry contaminant typically involve subjecting the waste oil to thermal pyrolysis.

For example, in U.S. Pat. No. 5,423,891, issued to Taylor, a process is disclosed for the gasification of solids waste. Heat carrier solids (HCS) are first heated and then fed co-currently with hydrocarbon-bearing solids waste through a rotary kiln retort. The solids waste and HCS co-mingle, transferring heat. The resulting temperatures of 1200 to 1500° F. are suitable to thermally pyrolyze the hydrocarbons in the waste. The resultant vapours are extracted for condensation. The retort solids and HCS are discharged from the kiln for recovery of the retort solids and re-heating of the HCS.

In Taylor's system the HCS are continuously circulated in a material handling loop. The HCS is a coarse granular solid which is heated outside the kiln and gives up its heat inside the kiln. Transport of the HCS around the loop involves considerable materials-handling equipment.

In U.S. Pat. No. 4,473,464, issued to Boyer et al., a process is disclosed for treating heavy crude oil. Carbonaceous solids are finely ground for concurrent feed with crude oil to an indirectly heated kiln. Pyrolyzed hydrocarbon vapours are condensed. Coke and carbonaceous solids are screened, ground and recycled outside the kiln. Heat loss to the solids is minimized and the crude oil is preheated to a temperature high enough to balance any temperature loss by the solids.

U.S. Pat. No. 4,303,477, issued to Schmidt et al., discloses co-currently adding a consumable fine-grained reactive solid to a waste material for binding metal and sulfur contaminants during treatment. The reactive solids, such as lime having a grain size typically less than 1 mm, and waste are thermally cracked as they progress through a rotating, indirectly fired kiln. The solids make a single pass through the kiln, the reactive solid being consumed in the process.

Some of the above described prior art processes involve significant material handling challenges in the recycling and conveyancing of large masses of hot, coarse solids. Other processes, which do not recycle hot solids, involve rejection of a portion of the oily waste or irreversibly consume a catalyst.

There is therefore a need for a simplified process for separating contaminants from used oils. It is the objective of the present invention to provide such a process.

SUMMARY OF THE INVENTION

The present invention provides a simple apparatus and process for reclaiming oil from used, contaminated oil feed. In general, the process comprises feeding used oil through a feed line to a rotating thermal reactor vessel wherein the oil is pyrolyzed to produce hydrocarbon vapour and coke. The contaminants become associated with the coke. The vapour and coked solids are separately removed from the vessel. The vapour is condensed to produce a substantially contaminant-free oil product and the contaminant-rich, dry coked solids are collected for disposal, possibly as feed for a cement kiln.

The equipment used includes a reactor comprising a rotating vessel housed in a heating chamber, means for feeding used oil into the rotating vessel, and an oil recovery system comprising a vapour extraction pipe, a solids removal cyclone, and vapour condensation equipment.

More particularly, the rotating vessel comprises a cylindrical side wall and end walls forming a single internal reaction chamber. Structural cylinders extend from the end walls along the vessel's longitudinal axis. The diameter of the end cylinders is small relative to that of the cylindrical side wall. A stationary external housing surrounds the vessel and combines therewith to form an annular heating chamber. The external housing is sealed to the end cylinders by rotary seals. A burner extends into the heating chamber. The rotating vessel is indirectly heated so that its internal surfaces are sufficiently hot to vaporize and pyrolyze the feed oil. The feed oil is introduced into the reaction chamber wherein it vaporizes and pyrolyzes, forming hydrocarbon vapour and coke. Metals and other contaminants become associated with the coke. A bed of non-ablating, granular coarse solids is provided within the reaction chamber. As the vessel rotates, the coarse solids scour the vessel's internal surface and comminute the coke into fine solids. The fine solids may include solids introduced with the feed oil. The vapour is extracted from the reaction chamber through an axial pipe extending through an end cylinder. The fine solids are separated within the reaction chamber from the coarse solids for removal from the vessel, preferably using a spiral chute. The chute spirals from a screened entrance at the vessel's circumference to a discharge outlet at the vessel's axis. The chute's screen excludes coarse solids and collects only the fine solids. The fine solids are conveyed out of the vessel through an end cylinder for disposal. Fine solids may also be elutriated with the vapours. Any fine solids associated with the vapours are separated out by processing in external means, such as a cyclone. The substantially solids-free vapours are then condensed to yield product oil. The contaminant-rich fine solids are collected for disposal.

Only a small portion of the feed oil is converted to coke, the remainder being recovered as a substantially contaminant-free product oil.

DESCRIPTION OF THE PREFERRED EMBODIMENT

Figure 1:
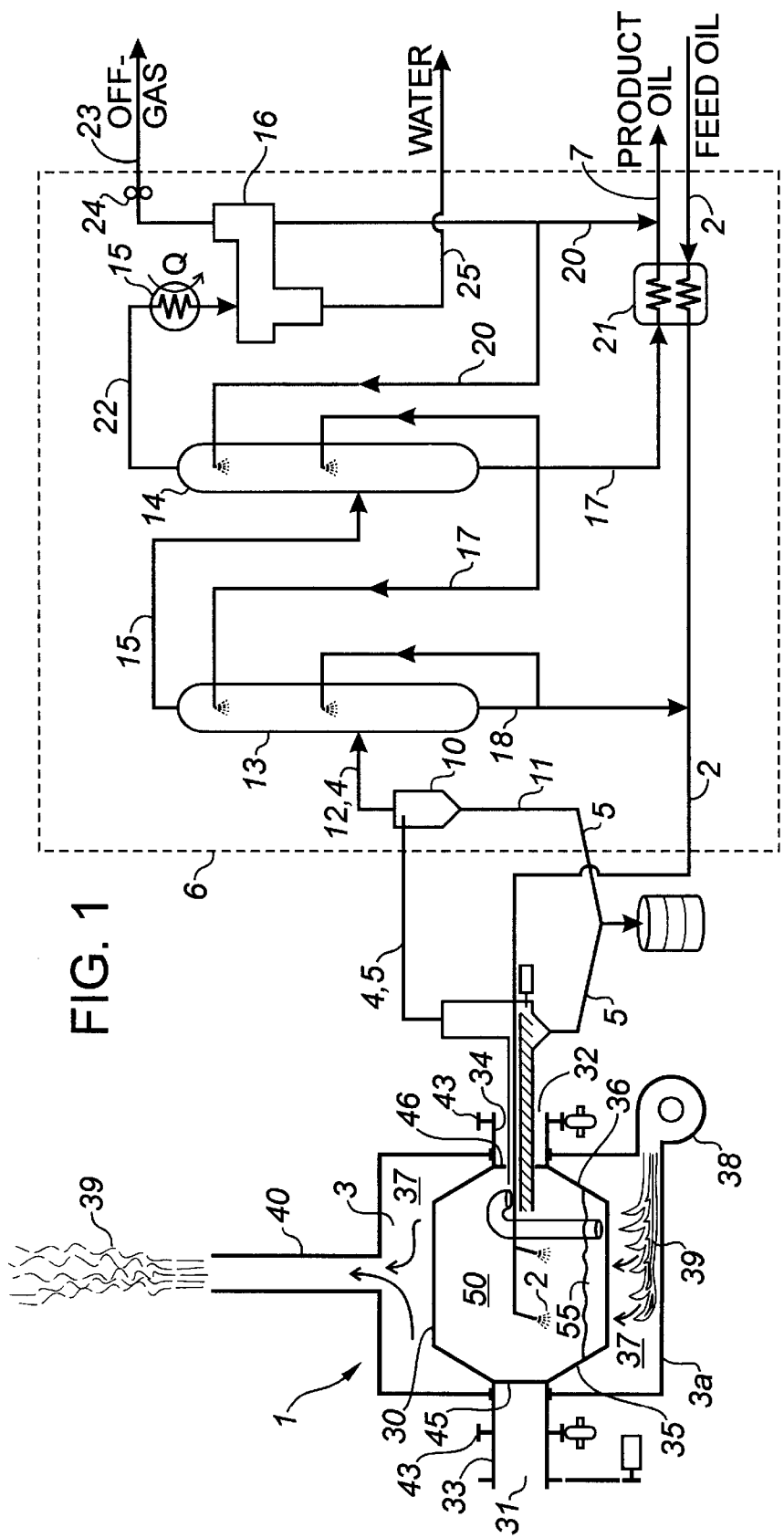
FIG. 1 is a schematic flow diagram of a contaminated oil thermal treatment reactor, heating chamber and hydrocarbon vapour condensation system according to one embodiment of the present invention.

Having reference to FIG. 1, the process is described in overview. A reactor 1 is provided for thermally treating used contaminated oil 2. The reactor 1 comprises a rotatable vessel 30 housed within a heating chamber 3 formed by a housing 3a. Heat is generated in the heating chamber 3 to heat the vessel 30. The vessel 30 forms a reaction chamber 50. Feed oil 2, contaminated with metals and one or both of water and solids, is fed to the reaction chamber 50 for the separation of the contaminant from the oil component. Within the reaction chamber 50: the feed oil is vaporized and pyrolyzed, producing a hydrocarbon vapour stream 4, which may contain steam; coke 5 is formed as a byproduct; metals and solid contaminants become associated with the coke 5; and the coke 5 is separated from the hydrocarbon vapours 4. The hydrocarbon vapours 4 leave the reaction chamber 50 and are conveyed to a vapour condensation system 6. Here the hydrocarbon vapours 4 are condensed as a substantially contaminant-free product oil 7, which is suitable to provide refinery feedstock. The coke 5 is removed from the reaction chamber 50 and is stockpiled or used as fuel.

In more detail, the vapour condensation system 6 comprises a cyclone 10 for stripping fine solids 11, including coke, from the hot vapours 4. The stripped solids 11 are discharged for disposal. The stripped vapour 12 proceeds through a vapour scrubber tower ("scrubber") 13, a quench tower ("quencher") 14, a heat exchanger 15 and on into an overhead drum 16. In the scrubber 13, light oil reflux 17 from the quencher 14 and re-circulated scrubber oil 18 cause a heavy fraction of the hydrocarbon stripped vapour 12 to condense (forming the scrubber oil 18), capturing any solids not removed by the cyclone 10. The heavy scrubber oil 18 is recycled to the reactor 1 by co-mingling it with the feed oil 2 before treatment. Un-condensed vapour 19 from the scrubber 13 is directed to the quencher 14 where light condensed oil 20 from the overhead drum 16 and recycled quencher oil 17 are refluxed for condensation of the majority of the vapour 19. The quencher oil 17 is passed through a heat exchanger 21 for preheating the feed oil 2. Un-condensed vapour 22 from the quencher 14 is directed to the overhead drum 16 for the separation of water from the lightest fraction of the condensed oil 20 and from non-condensible off-gases 23. An off-gas compressor 24 provides the impetus necessary to draw vapour 4 from the reaction chamber 50 of the reactor 1. Any separated water is discharged as a water product 25. The overhead drum oil 20 and quencher oil 17 are combined to form the product oil 7.

Figure 2:
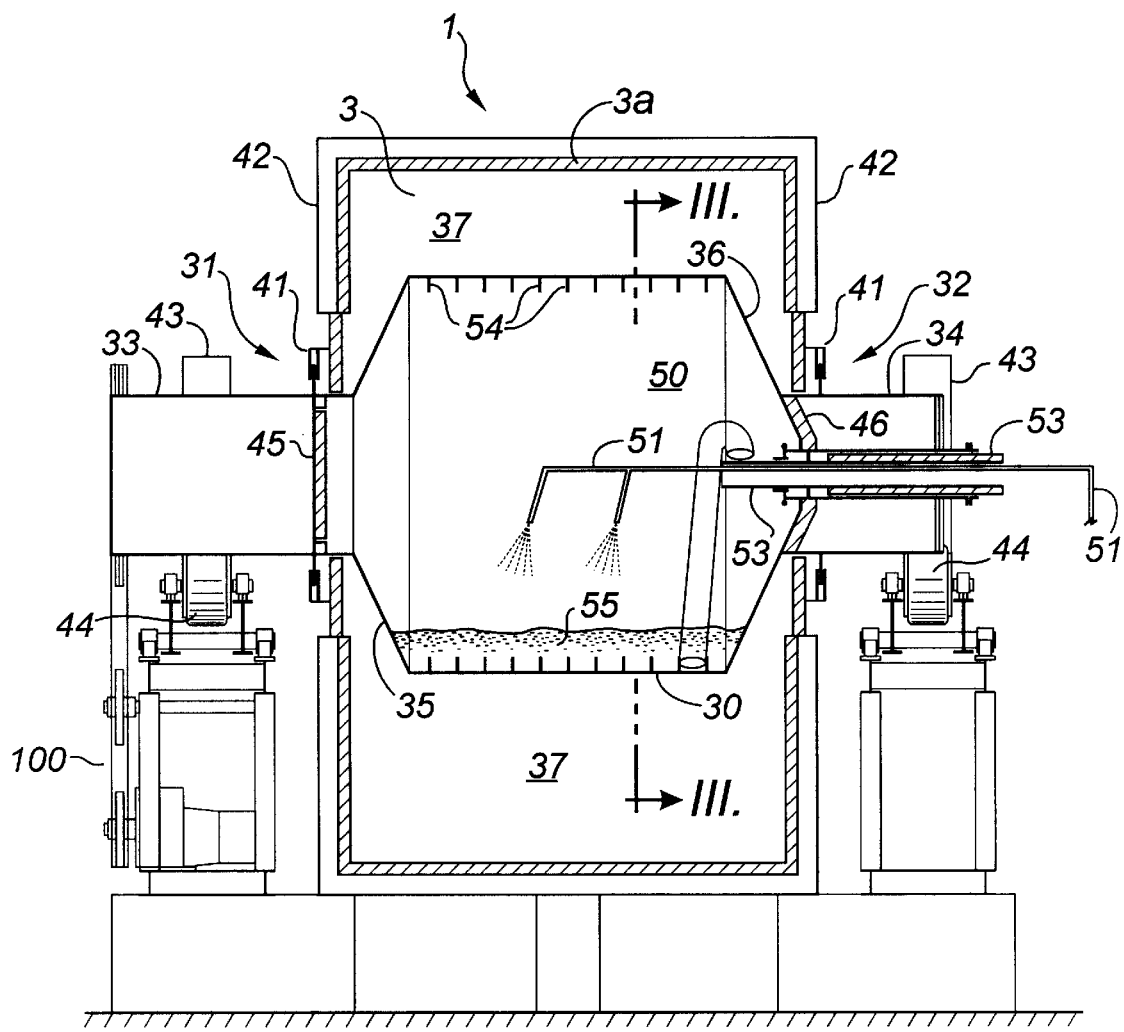
FIG. 2 is a cross-section of the heating chamber, reactor, rotary drive and support equipment according to the present invention.
Figure 3:
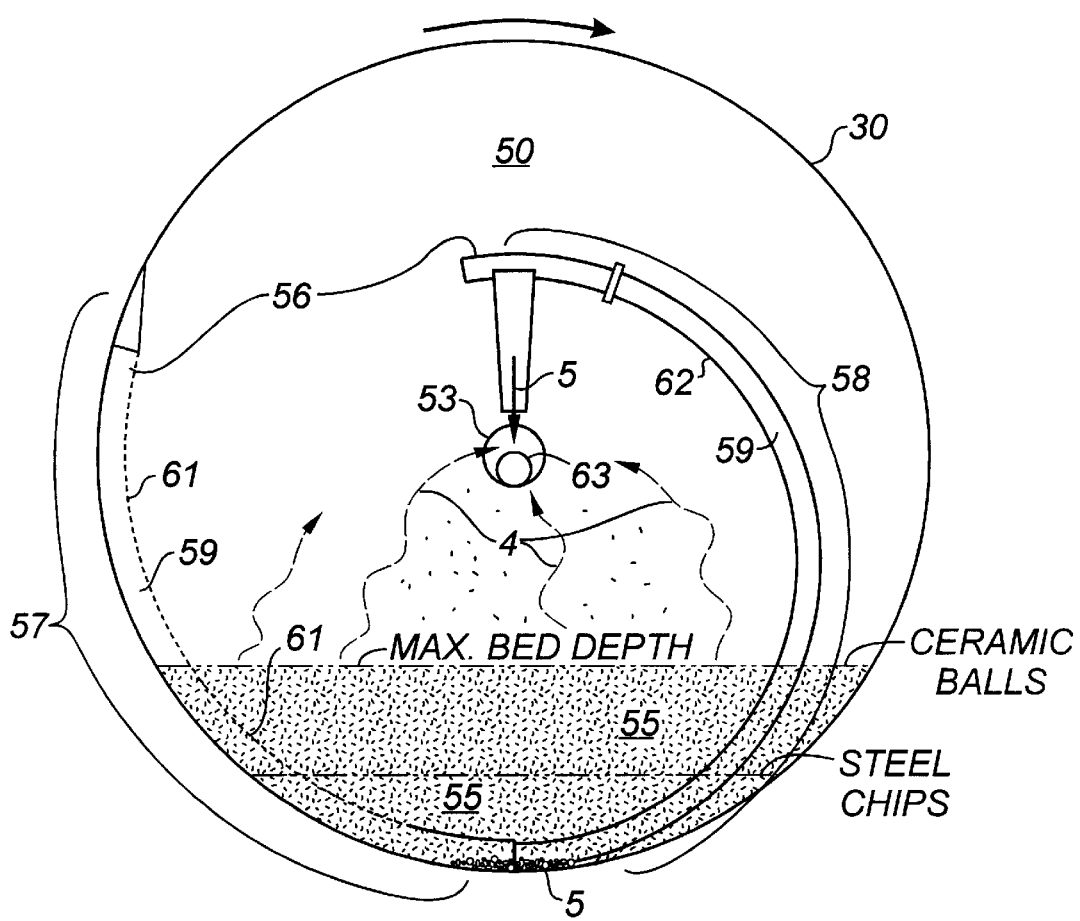
FIG. 3 is a cross-sectional view of the reactor vessel along line III—III of FIG. 2, showing in particular the fine solids removal chute.
Figure 4:
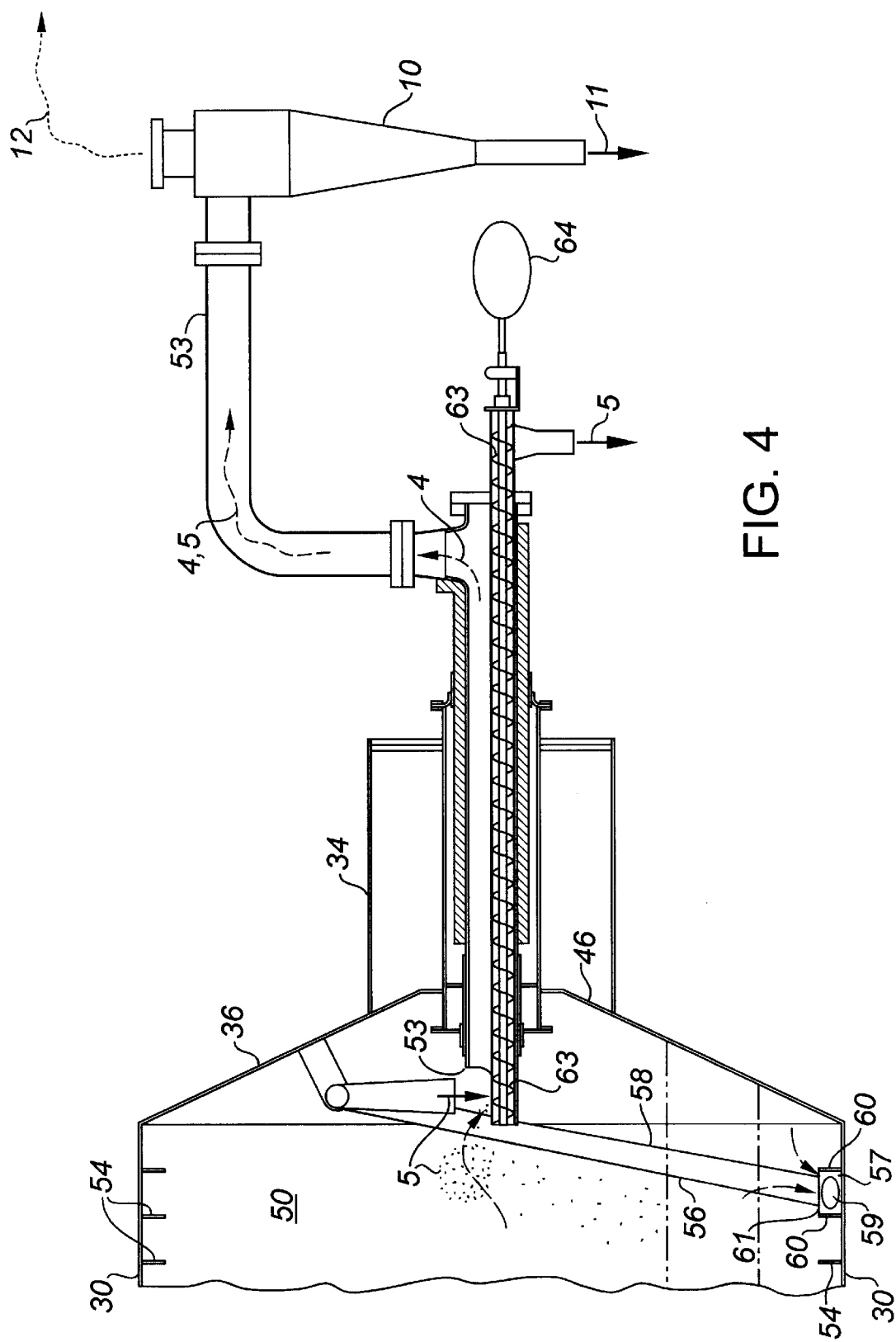
FIG. 4 is a partial cross-sectional view of the second end of the reactor vessel, featuring the fine solids removal chute and screw conveyor.

More specifically, and having reference to FIGS. 2 through 4, the reactor 1 comprises a rotatable vessel 30 having a first end 31 and a second end 32. The vessel 30 comprises a cylindrical side wall 101 connected by conical transition end walls 3,5 36 with end cylinders 33, 34 extending along the longitudinal axis of the vessel.

The vessel 30 is rotatably supported within the heating chamber 3. An annular space 37 or heating chamber is formed between the external chamber housing 3a and the vessel 30.

Burner 38 discharges heated combustion gas 39 for circulation through the annular space 37. A flue stack 40 at the top of the chamber 3 exhausts combustion gases 39.

The first and second end cylinders 33,34 extend through rotary seals 41 formed in the side walls 42 of the external housing 3. Riding rings 43 are mounted circumferentially to the cylinders 33,34, positioned outside of the chamber housing side walls 42. The riding rings and vessel are supported on rollers 44.

The reaction chamber 50 of the rotatable vessel 30 is sealed at its first and second ends 31,32 by first and second panels 45,46 respectively.

An axially positioned vapour pipe 53 extends through the second panel 46. The vapour pipe 53 connects the reaction chamber 50 and the condensation system 6. A feed oil line 51 extends through the vapour pipe 53 and the second end panel 46. The line 51 distributes and discharges feed oil 2 in the reaction chamber 50.

The vessel 30 contains internal heat transfer enhancing surfaces in the form of radially and inwardly extending rings or fins 54.

The reaction chamber 50 is charged with non-ablating, granular coarse solids which are permanently resident within the vessel 30. The coarse solids form a bed 55 in the bottom of the reaction chamber 50.

At the second end of the vessel 30 is a chute 56 for fines removal. The chute 56 has a circumferentially extending first portion 57 connected to a spiral second portion 58. The chute 56 forms a passageway 59 for the transport of fine solids to the vapour pipe 53. The chute extends opposite to the direction of rotation, from the first portion 57 to the second portion 58. Thus fine solids enter the first portion 57 of the chute 56 and advance through the second portion 58 as the vessel 30 rotates.

The chute's first portion 57 lies against the inside circumference of the vessel 30 and extends circumferentially for about 120°. The chute's first portion 57 comprises side walls conveniently formed by a pair of the adjacent fins 54, and a bottom formed by the wall of the vessel 30 at its outer radius. The inner radius or top of the first portion 57 is fitted with a screen 61. The openings of the screen 61 are small enough to exclude the relatively coarse granular solids yet permit passage of relatively fine solids.

The chute's second portion 58 is connected to the end of the first portion 57 and comprises a spiral pipe 62 which spirals inwardly from the vessel's circumference towards the vessel's centerline. The spiral pipe 62 rotates through about 180° to direct fine solids into the end of the vapour pipe 53. A screw conveyor 63 lies along the bottom of the vapour pipe 53 and extends therethrough to a point outside the heating chamber 3. A drive (not shown) rotates the screw conveyor 63.

From the foregoing, it will be understood that there is provided a pyrolyzing apparatus comprising:

a rotatable vessel 30 comprising a cylindrical side wall 101 and end walls 35, 36, together forming a single internal reaction chamber 50;

the vessel is connected at its ends with end cylinders 33, 34 which extend along the longitudinal axis of the vessel—these end cylinders have a smaller diameter than the side wall;

a stationary outer housing 3a surrounds the vessel and combines therewith to form an annular space or heating chamber 37;

a burner 38 is connected with the heating chamber and functions to provide heat in the reaction chamber by conduction through the vessel wall and the bed 55 of heat-conducting coarse solids, in sufficient amount so that contaminated oil in the reaction chamber will vaporize and pyrolyze to form hydrocarbon vapors and coke, with the result that contaminants concentrate in the coke;

a flue stack 40 vents hot combustion gas 39 from the heating chamber;

the vessel end cylinders protrude out through the wall of the stationary outer housing;

the outer housing has rotary seals 41 which seal around the rotating end cylinders, so that the vessel is sealed at its smallest diameter;

the vessel is rotated by means (such as the riding rings 43, support rollers 44 and drive assembly 100) associated with the end cylinders, so that the bed of coarse solids comminutes the coke to form fine particles;

the vessel contains a bed 55 of non-ablating, granular, coarse solids (such as metal chips) within the reaction chamber—these solids function to scour and comminute coke from the vessel wall and help to create a thermal mass within the reaction chamber;

means (such as the line 51) are provided for feeding contaminated used oil into the reaction chamber;

first means (such as the axially positioned vapour pipe and screw conveyor 63) are provided for removing fine solids (the coke particles) from the vessel through the end cylinder 34;

second means (such as the screened chute 56) are provided for separating fine solids (the coke particles) from the coarse solids (the metal chips) adjacent the vessel side wall and conveying the separated fine solids to the first means for removal from the vessel as a separate solids stream;

third means (such as the axially positioned vapour pipe 53) are provided for removing hydrocarbon vapours from the reaction chamber through the end cylinder 34 as a separate vapour stream containing some fine coke particles; and fourth means (such as the vapour condensation system 6) connected to the third means, are provided for separating residual fine solids from the vapour stream and condensing hydrocarbons from the vapour stream.

Referring again to FIG. 1, in operation, the vessel 30 is rotated on its axis. Radiant and conductive heat from the burner's combustion gases 39 heat the annular space 37 and the walls of the vessel 30. The rotary seals 41 are cooled with a flow of combustion air (not shown).

Heat is indirectly transferred by conduction through the walls of the rotating vessel 30 to the reaction chamber 50. Heat is transferred from the vessel's walls and fins 54 to the coarse solids to maintain their temperature at about 800–1300° F., which is sufficiently high so that feed oil is vaporized and pyrolized. Typically, the corresponding range of heating chamber temperatures required is about 1025–1450° F.

Contaminated oil 2 is fed through line 51 to the reaction chamber 50 of the rotating vessel 30. If liquid water is fed to the reaction chamber 50, it will flash and can upset the sub-atmospheric pressure balance. Preheating the oil 2 via exchanger 21 vaporizes water to steam and aids in conservation of heat. Small amounts of water (say less than about 1 wt. %) present in the feed oil 2 may not require preheating.

As the vessel 30 rotates, the coarse solids form a bed 55 which continuously brings the bed's contents into contact with the vessel's side walls and fins 54, scouring the contacted surfaces. The coarse solids absorb heat as they contact the vessel 30.

In a first embodiment, the feed oil 2 is directed to contact the reactor vessel cylindrical wall just before it rotates under the bed 55. The thermal mass of the vessel 30 provides sufficient heating load to substantially instantaneously vaporize and pyrolyze the oil. Hydrocarbon vapour 4 is produced and a solid coke byproduct 5 forms on the surfaces of the cylindrical walls of the vessel 30 and the fins 54.

Contaminants, such as metals and solids, remain substantially associated or concentrated with the coke.

In a second embodiment, the oil is directed to contact the bed 55 which is maintained at pyrolysis temperatures through conductive heat transfer with the vessel side wall. The bed 55 is required to provide the thermal load to pyrolyze the oil. The wall of the vessel 30 is maintained at higher temperature than in the first embodiment as required to maintain sufficient temperature of the coarse solids in the bed 55.

In both embodiments, the bed of coarse solids scour the vessel walls and fins. The contaminant-rich coke and solids, which may have been associated with the feed oil, are scoured and comminuted into fine solid particles ("fine solids") which are free of the walls and the coarse solids.

Produced vapour 4 is extracted through the vapour pipe 53. The velocity of the vapour exiting the reactor vessel will elutriate some of the fine solids 5. The elutriated fine solids 5 exit the vapour pipe 53 and are passed through the cyclone 10 for separation of the solids 5 from the vapour stream 4.

As described above, the vapour stream 4 is passed through the condensation system 6, resulting in a liquid product 7 and a non-condensible off-gas stream 23. The liquid product 7 is sufficiently free of contaminants so as to be acceptable as a refinery feedstock. The off-gases 23 may be flared or be recycled to fuel the heating chamber burners 38.

The performance of the system is illustrated in the following example:

EXAMPLE I

A cylindrical reactor vessel 30, 10 feet in diameter and 8 feet in length, was constructed of ½" thick stainless steel. A plurality of 4" tall, ½" thick fins 54 were installed, at 8" spacings. Two 4 foot diameter cylinders formed the first and second ends 31, 32. A riding ring 43 was located on each cylinder 33, 34 and was rotatably supported on solid rubber rollers mounted on walking beams. A sprocket and chain drive assembly 100 at the extreme outboard end of the first end cylinder enabled rotation of the vessel.

The chute 56 comprised an 8" by 4" rectangular section first portion 57 and a 4" diameter pipe spiral second portion 58. The chute encompassed about 330° of rotation.

In a first test, the vessel was charged with 8500 pounds of inert ceramic balls available under the trade mark Denstone 2000, from Norton Chemical Process Products Corp, Akron, Ohio. As seen in FIG. 3, this produced a deep bed, the chord of which was about 120°. The vessel was rotated at 3 to 4 rpm. The feed oil was directed to be distributed along the rolling bed.

Two burners 38 provided about two million BTU/hr for maintaining the heating chamber 3 at about 1380° F. The resulting heat transfer through the vessel wall raised the temperature of the ceramic balls to about 805° F.

185 barrels per day of 28° API contaminated lube oil was preheated to 480° F. before discharging it into the reactor 1. The oil contained about 0.6% water. The reactor was maintained at a slight vacuum of −1 to −2 inches of water column.

Vapour was extracted from the reaction chamber 50 and condensed to produce 175 bbl/day of 32° API product oil. The product oil was primarily quencher oil (95 to 98%) with a small contribution (2 to 5%) from the overhead drum oil. Vapour scrubber bottom oil was recycled to the reactor 1 at about 18.5 bbl/day (note that the solids fraction for this test was about 0.5% and is expected to be higher in other tests). The total production of non-condensible off-gases was 1912 kg/day. A further 147 kg/day of water was separated and produced from the condensation system.

Coke, containing contaminants, was produced at rates of 445 kg/day. In summary:

TABLE 1

| Feed Rate | 185 bbl/day | 28 ° API |
| --- | --- | --- |
| Scrubber recycle | 18.5 bbl/day | (<0.5% solids) |
| Product oil | 175 bbl/day | 32 ° API |
| off-gas | 1912 kg/day | |
| water | 147 kg/day | |
| coke | 445 kg/day | |

An analysis of the feed oil and the product oil confirmed a 99.84% removal of metals. This was achieved with only a 5.4% reduction in the original volume of feed oil, demonstrating little degradation of the feed oil. The resulting oil was slightly lighter product, having reduced its gravity from 28 to 32 API. Total halides were also reduced by 80%. A more detailed analysis is shown in Table 2.

TABLE 2

| Parameter | Feed Oil ug/g | Quencher Oil ug/g | Scrubber Oil ug/g | Coke ug/g |
| --- | --- | --- | --- | --- |
| Aluminum | 9.4 | 0 | 4.1 | 1100 |
| Barium | 5.6 | 0 | 2.1 | 230 |
| Beryllium | 0 | 0 | 0 | 0 |
| Calcium | 870 | 0 | 95 | 51700 |
| Cadmium | 0.7 | 0 | 0.2 | 41 |
| Cobalt | 0.04 | 0 | 0.04 | 26 |
| Chromium | 1.8 | 0 | 0.29 | 130 |
| Copper | 46 | 0.02 | 5.7 | 2400 |
| Iron | 120 | 0.12 | 21 | 8400 |
| Lead | 61 | 0 | 27 | 3000 |
| Magnesium | 390 | 0 | 45 | 23700 |
| Manganese | 68 | 0.02 | 8.8 | 4000 |
| Molybdenum | 12 | 0 | 1.5 | 720 |
| Nickel | 0.95 | 0 | 0.34 | 110 |
| Potassium | 130 | 0 | 14 | 4000 |
| Silver | 0 | 0 | 0 | 0 |
| Sodium | 380 | 1.9 | 51 | 21000 |
| Strontium | 1.6 | 0 | 0.23 | 97 |
| Titanium | 0.72 | 0 | 0.32 | 69 |
| Vanadium | 0 | 0 | 0 | 0 |
| Zinc | 880 | 0.27 | 170 | 51400 |
| Zirconium | 0.02 | 0 | 0 | 3 |
| Boron | 11 | 1.1 | 0.78 | 130 |
| Phosphorus | 820 | 2.8 | 160 | 50800 |
| Total Metals | 3808.8 | 6.2 | | |
| Halides | 490 | 98.5 | | |

Assuming no metals reported to the overhead oil, the reduction of metals from the feed oil to the product oil was determined to be (3808.8−6.2)/3808.8=99.8%. The metals reported substantially to the coke.

The reduction in halides was found to be (490−98.5)/490= 80%.

The ceramic balls were not entirely successful in scouring all of the coke from the reactor vessel walls. Thus, most of the fine coke was produced via elutriation and not through the spiral chute whose screen became blinded by coke accumulation.

EXAMPLE II

In a second test run performed on the same equipment, the ceramic balls were replaced with a charge of cylindrical, 1 to 2" diameter, ½" thick spring steel punchings or chips. Also shown in FIG. 3, about 3300 pounds of chips formed a shallow bed level in the vessel having a bed chord angle of about 75°.

The feed oil was directed to impinge directly upon the reactor vessel wall. The thermal load to vaporize the oil was provided by the wall itself and not the steel chips. Thus, the wall did not need to conduct a large amount of heat to the chips through conduction and the wall temperature was correspondingly lower.

The steel chips successfully scoured coke from the vessel walls, sufficient to prevent blinding of the chute's screen and permit sustainable extraction of fine coke from the reaction zone as it was produced.

A comparison of the process temperature conditions in both the ceramic ball and steel chip runs are as follows, presented in Table 3 (rounded to the nearest 5° F.).

TABLE 3

(° F.)

| | Balls EXAMPLE I | Chips EXAMPLE II |
| --- | --- | --- |
| Reactor Bed | 805 | 840 |
| Reactor Vessel Wall | 1290 | 930 |
| Heating Chamber | 1380 | 1020 |
| Feed Oil | 480 | 480 |
| Vapour Scrubber | 700 | 700 |
| Quencher | 465 | 465 |
| Overhead Drum | 85 | 85 |

The above process embodies the following advantages:

it is a continuous process with continuous removal of coke containing contaminants;

removal of contaminants is achieved with minimal degradation of the feed oil;

there is a minimal requirement for materials handling equipment, comprising only of a rotating vessel, a screw conveyor and a cyclone;

avoiding the use of consumables; and simplicity of operation.

The embodiments of the invention in which an exclusive property or privilege is claimed are defined as follows:

1. Pyrolyzing apparatus for removing contaminants from oil, comprising:

a rotatable vessel formed by a cylindrical side wall and end walls, the end walls being connected with end cylinders having a smaller diameter than the side wall, the vessel forming a single internal reaction chamber and having inner and outer surfaces and a longitudinal axis, the end cylinders being positioned along the longitudinal axis;

a stationary outer housing surrounding the vessel and forming an annular space therebetween, the vessel protruding from the housing, the housing having rotary seals engaging the end cylinders for retaining combustion gases;

non-ablating, granular, heat-conducting coarse solids forming a bed within the reaction chamber for scouring and comminuting coke formed on the vessel inner surface and providing a thermal mass when heated;

burner means, connected with the annular space, for sufficiently heating the outer surface of the vessel to heat the vessel side wall, the bed and the reaction chamber by conduction, to cause vaporization and pyrolysis of the oil in the reaction chamber, the housing having means for venting combustion gas from the annular space;

feed means for feeding contaminated oil into the reaction chamber whereby the oil will vaporize and pyrolyze to form hydrocarbon vapours and coke and contaminants concentrate in the coke;

means, associated with the end cylinders, for rotating the vessel so that the bed of coarse solids comminutes the coke to form fine solids;

first means for removing fine solids from the reaction chamber through an end cylinder;

second means, internal of the reaction chamber, for separating fine solids from the coarse solids adjacent the vessel side wall and conveying the separated fine solids to the first means for removal from the vessel as a separate solids stream;

third means for removing hydrocarbon vapours from the reaction chamber through an end cylinder as a separate vapour stream containing fine solids; and fourth means, connected with the third means, for separating entrained fine solids from the vapour stream and condensing hydrocarbons from the vapour stream.

2. The apparatus as set forth in claim 1 wherein:

the third means is a vapour pipe which extends along the longitudinal axis of the vessel.

3. The apparatus as set forth in claim 2 wherein the first means extends through the vapour pipe.

4. The apparatus as set forth in claim 1, 2 or 3 wherein the second means comprises a spiral chute having a screened inlet adjacent the side wall of the vessel, for separating fine coke particles from the coarse bed solids, and an outlet discharging into the first means.

* * * * *

UNITED STATES PATENT AND TRADEMARK OFFICE
CERTIFICATE OF CORRECTION

PATENT NO. : 6,203,765 B1
DATED : March 20, 2001
INVENTOR(S) : William Taciuk et al.

It is certified that error appears in the above-identified patent and that said Letters Patent is hereby corrected as shown below:

Claim 1,
Line 8, change "July 10, 1996" to "October 7, 1996".

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,203,765 B1  Page 1 of 1
DATED : March 20, 2001
INVENTOR(S) : William Taciuk et al.

It is certified that error appears in the above-identified patent and that said Letters Patent is hereby corrected as shown below:

<u>Column 1,</u>
Line 8, change "July 10, 1996" to "October 7, 1996".

This certificate supersedes certificate of correction issued November 27, 2001.

Signed and Sealed this

Twenty-ninth Day of January, 2002

Attest:

Attesting Officer

JAMES E. ROGAN
*Director of the United States Patent and Trademark Office*